(12) United States Patent
Yuuki et al.

(10) Patent No.: US 9,816,430 B2
(45) Date of Patent: Nov. 14, 2017

(54) PRE-COMBUSTION-CHAMBER TYPE GAS ENGINE

(71) Applicant: Mitsubishi Heavy Industries, Ltd., Tokyo (JP)

(72) Inventors: Akihiro Yuuki, Tokyo (JP); Daisuke Takemoto, Tokyo (JP); Yuta Furukawa, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 15/026,169

(22) PCT Filed: Oct. 20, 2014

(86) PCT No.: PCT/JP2014/077809
§ 371 (c)(1),
(2) Date: Mar. 30, 2016

(87) PCT Pub. No.: WO2015/060236
PCT Pub. Date: Apr. 30, 2015

(65) Prior Publication Data
US 2016/0245151 A1    Aug. 25, 2016

(30) Foreign Application Priority Data

Oct. 21, 2013  (JP) .................................. 2013-218385

(51) Int. Cl.
*F02B 19/08*  (2006.01)
*F02B 19/12*  (2006.01)
(Continued)

(52) U.S. Cl.
CPC ............ *F02B 19/08* (2013.01); *F02B 19/108* (2013.01); *F02B 19/12* (2013.01); *F02B 19/18* (2013.01);
(Continued)

(58) Field of Classification Search
CPC ........ F02B 19/08; F02B 19/12; F02B 19/108; F02B 43/04; F02M 21/0242; F02M 21/0275
(Continued)

(56) References Cited

U.S. PATENT DOCUMENTS

| | | | | |
|---|---|---|---|---|
| 5,947,076 | A  * | 9/1999 | Srinivasan | ............... F02B 19/12 123/256 |
| 2002/0104507 | A1* | 8/2002 | Riggs | ...................... F02B 19/12 123/266 |
| 2010/0132660 | A1* | 6/2010 | Nerheim | ............. F02B 19/1014 123/260 |

FOREIGN PATENT DOCUMENTS

| | | |
|---|---|---|
| JP | 61155754 A | 7/1986 |
| JP | 63162922 A | 7/1988 |

(Continued)

OTHER PUBLICATIONS

Notification Concerning Transmittal of Internatonal Preliminary Report on Patentability, App. No. PCT/JP2014/077809, Filed Oct. 20, 2014, dated May 6, 2016, 13 Pages.
(Continued)

*Primary Examiner* — Mahmoud Gimie
(74) *Attorney, Agent, or Firm* — Berkeley Law & Technology Group, LLP

(57) ABSTRACT

An object is to improve a trap effect to trap ignition fuel gas supplied to a pre-combustion chamber and reduce an amount of non-combusted ignition fuel gas flowing out of the pre-combustion chamber to suppress a decrease in combustion efficiency. A pre-combustion-chamber type gas engine includes: a pre-combustion chamber Sr disposed on a cylinder head portion 10; a spark plug 20 disposed on an upper part of the pre-combustion chamber Sr; a pre-combustion-chamber gas supply mechanism configured to supply ignition fuel gas "g" to the pre-combustion chamber Sr via gas
(Continued)

supply channels for the pre-combustion chamber 22a and 22b with an opening on an upper part of the pre-combustion chamber Sr; and a check valve 24 disposed in the gas supply channel 22b for the pre-combustion chamber. The opening of the gas supply channel 22a for the pre-combustion chamber is disposed on a lower surface of a cover member 16 forming the pre-combustion chamber Sr or on an upper section of a side wall of a pre-combustion-chamber member 14, the opening facing in a tangent direction of a side-wall inner peripheral surface 14a of the pre-combustion-chamber member 14. The ignition fuel gas "g" supplied to the pre-combustion chamber Sr forms a swirl flow s1 which swirls about a longitudinal axis x of the pre-combustion chamber Sr inside the pre-combustion chamber Sr.

6 Claims, 12 Drawing Sheets

(51) Int. Cl.
*F02B 19/10* (2006.01)
*F02M 21/02* (2006.01)
*F02B 43/04* (2006.01)
*F02B 19/18* (2006.01)

(52) U.S. Cl.
CPC ............. *F02B 43/04* (2013.01); *F02M 21/02* (2013.01); *F02M 21/0242* (2013.01); *F02M 21/0248* (2013.01); *F02M 21/0275* (2013.01); *F02M 21/0281* (2013.01); *Y02T 10/125* (2013.01); *Y02T 10/32* (2013.01)

(58) Field of Classification Search
USPC .............................. 123/263, 27 GE, 525, 260
See application file for complete search history.

(56) References Cited

FOREIGN PATENT DOCUMENTS

| JP | 63300958 A | 12/1988 |
|----|------------|---------|
| JP | 0245755 A | 2/1990 |
| JP | H03042025 U | 4/1991 |
| JP | 539721 A | 2/1993 |
| JP | 2001003753 A | 1/2001 |
| JP | 2009197704 A | 9/2009 |
| JP | 2009221936 A | 10/2009 |
| JP | 2010144516 A | 7/2010 |
| WO | 2013096979 A1 | 7/2013 |

OTHER PUBLICATIONS

International Search Report, App. No. PCT/JP2014/077809, Filed Oct. 20, 2014, dated Dec. 22, 2014, 13 Pages.
Decision to Grant a Patent, App. No. JP2015-543836, Drafting Date Nov. 22, 2016, dated Dec. 2, 2016, 6 Pages.
Extended European Search Report, App. No. 14854912.4, dated Jun. 2, 2017, 8 Pages.

* cited by examiner

FIG. 3A
FIG. 3B
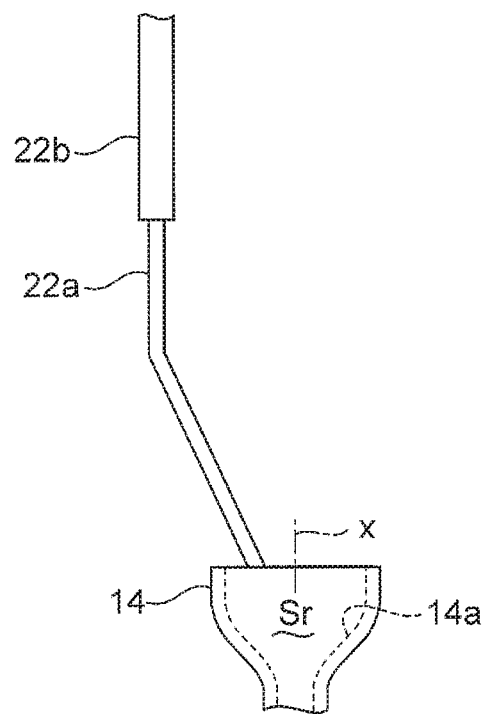
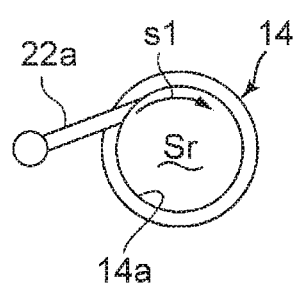

A-A CROSS SECTION

A-A CROSS SECTION

B-B CROSS SECTION

E.VALVE: EXHAUST VALVE
I.VALVE : INTAKE VALVE

PRE-COMBUSTION-CHAMBER TYPE GAS ENGINE

TECHNICAL FIELD

The present disclosure relates to a pre-combustion-chamber type gas engine which performs spark ignition inside a pre-combustion chamber.

BACKGROUND ART

A common gas engine includes a spark plug disposed inside a combustion chamber, and flame-propagating combustion is performed starting from ignition of fuel gas by the spark plug. However, if lean-premix combustion is to be performed, or if a bore diameter is large (e.g. approximately 150 mm), it may be difficult to perform flame-propagating combustion in a limited time by ignition using a spark plug, and thus combustion efficiency may not be improved.

As a countermeasure to the above, a plurality of plugs may be provided, or a pre-combustion-chamber type gas engine may be employed.

A pre-combustion-chamber type gas engine is used for a gas engine which has a large bore diameter and which performs lean-premix combustion. The combustion process of the pre-combustion-chamber type gas engine is as follows.

(1) Fuel gas or rich air-fuel mixture is supplied to a pre-combustion chamber from a supply line of ignition fuel gas.

(2) In a compression stroke, lean premixed gas in a main combustion chamber flows into the pre-combustion chamber through a nozzle of the pre-combustion chamber to be mixed with the fuel gas or the rich air-fuel mixture in the pre-combustion chamber, and a theoretical combustion mixture ratio is achieved immediately before ignition.

(3) A spark plug sparks in the pre-combustion chamber and flame propagation combustion occurs.

(4) Combustion gas flows out to the main combustion chamber through the nozzle of the pre-combustion chamber in form of a torch.

(5) Torch combustion and flame propagating combustion occur in the main combustion chamber.

According to the above combustion process, low emission can be achieved because lean premixed gas is in the main combustion chamber. Further, even with lean premixed gas in the main combustion chamber, combustion can be completed in the main combustion chamber at a sufficient speed because a torch flame with enough energy is injected from the pre-combustion chamber.

Ignition fuel gas can be supplied to the pre-combustion chamber through the following two approaches, for instance:

(A) Provide a valve opened and closed by a cam in a gas supply channel for pre-combustion chamber for supplying ignition fuel gas, and supply fuel gas at a timing and a lift amount determined in advance.

(B) Provide a check valve in the gas supply channel for pre-combustion chamber, and supply ignition fuel gas at a certain timing corresponding to a differential pressure between a supply pressure (cylinder pressure) of fuel gas supplied from the main combustion chamber to the pre-combustion chamber and a pressure inside the pre-combustion chamber.

The approach (B) is more advantageous than the approach (A) in that the facility can be reduced in size and cost.

Patent Document 1 discloses a pre-combustion-chamber type gas engine with a pre-combustion chamber equipped with a spark plug and an ignition-fuel-gas channel that has an opening into the pre-combustion chamber. The pre-combustion-chamber type gas engine includes a throat-shaped channel or a ledge-shaped projection for narrowing a transverse plane of the pre-combustion chamber before the spark plug disposed in the pre-combustion chamber. With this configuration, rich air-fuel mixture with low flux is formed in the vicinity of the spark plug, which makes it possible to secure safe ignition.

Patent Document 2 discloses a pre-combustion-chamber type gas engine including a gas supply channel for pre-combustion chamber equipped with a check valve. The check valve opens and closes in accordance with a differential pressure between a channel upstream pressure and a pressure inside a pre-combustion chamber (cylinder pressure) as described above, and more specifically, opens when the pressure inside the pre-combustion chamber decreases to a predetermined value.

CITATION LIST

Patent Literature

Patent Document 1: JPH3-42025U (Utility model)
Patent Document 2: JP2001-003753A

SUMMARY

Problems to be Solved

FIGS. 17A to 17C illustrate an example of an operation state of a check valve in a single combustion cycle (a crank angle changes from)(−360°) to (+360°)), of a gas engine, where the approach (B) is employed. In FIG. 17A, line A represents a pre-combustion-chamber gas supply pressure (set pressure) at the upstream side of the check valve, and line B represents a pressure inside the pre-combustion chamber, which is a pressure of a main combustion chamber. FIG. 17B shows a lift amount of the check valve in a single combustion cycle, and FIG. 17C shows a total flow rate of ignition fuel gas having flowed through the check valve in a single combustion cycle.

In FIG. 17A to FIG. 17C, a piston is at the top position inside a cylinder when the crank angle is (−360°), (0°), and +360°), and at the bottom position when the crank angle is (−180° and (+180°). An intake valve opens at (+360°), and closes at a stage earlier than (−180°). Further, an exhaust valve opens at a stage earlier than (+180°), and closes at (−360°). Zone C in FIG. 17A represents a combustion process of the main combustion chamber and the pre-combustion chamber.

As illustrated in FIG. 17A, depending on the supply pressure (set pressure) of ignition fuel gas represented by line A, the cylinder pressure may be lower than the fuel gas supply pressure in an exhaust stroke, causing the check valve to open (zone E). The ignition fuel gas supplied to the pre-combustion chamber in the exhaust stroke may flow into the main combustion chamber before air-fuel mixture flows into the pre-combustion chamber from the main combustion chamber in a compression stroke, or may flow out of the main combustion chamber through the exhaust valve. Accordingly, ignition fuel gas supplied for combustion in the pre-combustion chamber flows out without being combusted, which raises the need to supply excessive ignition fuel gas to make up for the outflow.

Further, if a set value of the supply pressure of the ignition fuel gas at the upstream side of the check valve is lowered to prevent the opening operation of the check valve in the exhaust stroke, a supply amount of fuel gas to the pre-combustion chamber decreases when the check valve opens at a timing before the compression stroke, which may lead to shortage of a required amount of fuel gas (zone D).

Also, if the check valve opens in zone D, ignition fuel gas supplied to the pre-combustion chamber may fail to be trapped in the pre-combustion chamber, depending on the supply direction, and the fuel gas may leak out to the main combustion chamber.

In the Otto cycle, which is a theoretical cycle of a gas engine, thermal efficiency can be enhanced by increasing the maximum pressure and the maximum temperature. Further, combustion fluctuation of a gas engine is great, and thermal efficiency decreases when the maximum pressure decreases. In the above process (2), combustion fluctuation of the main combustion chamber is considerably affected by a mixing state inside the pre-combustion chamber of ignition fuel gas supplied from the gas supply channel for pre-combustion chamber and lean premixed gas flowing in from the main combustion chamber. Thus, to increase thermal efficiency of a gas engine, it is necessary to promote mixing inside the pre-combustion chamber to uniform air-fuel mixture inside the pre-combustion chamber.

At least one embodiment of the present invention was made in view of the above problem, and an object is to provide a pre-combustion-chamber type gas engine with an improved trap effect to trap ignition fuel gas supplied to a pre-combustion chamber, so as to extend a residence time of ignition fuel gas inside the pre-combustion chamber, thereby reducing an amount of non-combusted ignition fuel gas flowing out of the pre-combustion chamber and suppressing a decrease in combustion efficiency.

Solution to the Problems

A pre-combustion-chamber type gas engine according to at least one embodiment of the present invention comprises: a pre-combustion chamber disposed on a cylinder head portion; a spark plug disposed on an upper part of the pre-combustion chamber; a pre-combustion-chamber gas supply mechanism configured to supply ignition fuel gas to the pre-combustion chamber via a gas supply channel for the pre-combustion chamber, the gas supply channel having an opening on an upper part of the pre-combustion chamber; and an opening-closing valve configured to open and close the gas supply channel for the pre-combustion chamber.

The opening-closing valve is, for instance, a check valve which opens and closes in accordance with a differential pressure between a pressure inside the pre-combustion chamber and a pressure in a channel that opens into the pre-combustion chamber, or, a solenoid valve which is controlled to open and close in accordance with a detection pressure of the pre-combustion chamber. Alternatively, the opening-closing valve may open and close in conjunction with a crank angle of a piston.

To achieve the above object, in at least one embodiment of the present invention, the opening of the gas supply channel for pre-combustion chamber is disposed on an upper wall of a partition wall forming the pre-combustion chamber or on an upper section of a side wall of the partition wall, the opening facing in a tangent direction of a side-wall inner peripheral surface forming the pre-combustion chamber. Thus, the ignition fuel gas supplied to the pre-combustion chamber forms a first swirl flow which swirls about and around a longitudinal axis of the pre-combustion chamber inside the pre-combustion chamber.

In this way, it is possible to extend the time the ignition fuel gas stays in the pre-combustion chamber, which makes it possible to reduce outflow of non-combusted ignition fuel gas to a main combustion chamber from a nozzle disposed on the pre-combustion chamber. As a result, it is possible to improve combustion efficiency and to reduce excessive supply of ignition fuel gas.

In an aspect of the present invention, if there is such a space outside the sidewall forming the pre-combustion chamber that the pre-combustion-chamber gas can be formed therein, the gas supply channel for the pre-combustion chamber may be disposed outside the side wall forming the pre-combustion chamber, and be connected to the upper section of the side wall forming the pre-combustion chamber. In this way, it is possible to take advantage of the space outside the side wall of the pre-combustion chamber, and to facilitate injection of ignition fuel gas in a direction orthogonal to the longitudinal axis of the pre-combustion chamber if ignition fuel gas is to be injected into the pre-combustion chamber. Thus, it is possible to further extend the time the ignition fuel gas stays in the pre-combustion chamber.

In contrast, there may be a case in which the gas supply channel for the pre-combustion chamber can be disposed only on an upper part of the pre-combustion chamber, due to limitation based on a layout of the gas supply channel for the pre-combustion chamber. In this case, the gas supply channel for the pre-combustion chamber extends downward toward the pre-combustion chamber from above the pre-combustion chamber, and is connected to the pre-combustion chamber.

Further, in an aspect of the present invention, the pre-combustion-chamber type gas engine may further include a pocket portion disposed on a joint between the gas supply channel for the pre-combustion chamber and the partition wall forming the pre-combustion chamber, the pocket portion including an interior space into which the ignition fuel gas flows from the gas supply channel for the pre-combustion chamber, and a communication hole through which the interior space and the pre-combustion chamber communicate with each other, the communication hole having an opening facing in a tangent direction of the side-wall inner peripheral surface of the pre-combustion chamber.

With the pocket portion provided as described above, even if the gas supply channel for the pre-combustion chamber can be disposed only on the upper part of the pre-combustion chamber, it is possible to inject ignition fuel gas in a direction orthogonal to the longitudinal direction of the pre-combustion chamber, while causing the ignition fuel gas to form a swirl flow swirling about the longitudinal axis of the pre-combustion chamber. Thus, it is possible to further improve the trap effect to trap the ignition fuel gas inside the pre-combustion chamber.

Further, in an aspect including the pocket portion, the pocket portion may be formed inside the upper section of the partition wall forming the pre-combustion chamber. In this way, formation of the pocket portion is facilitated, and no extra space is required to form the pocket portion outside the pre-combustion chamber, which is another advantage.

Further, in an aspect of the present invention, the sidewall inner peripheral surface forming the pre-combustion chamber and including the opening of the gas supply channel for the pre-combustion chamber may have a region cut out to have a cutout surface formed into an arc shape, the region being on a side toward which the ignition fuel gas flows from the opening of the gas supply channel for the pre-combustion chamber.

In this way, formation of a swirl flow with an even stronger centrifugal force is facilitated, which makes it possible to further improve the trap effect to trap the ignition fuel gas inside the pre-combustion chamber.

Further, in an aspect of the present invention, air-fuel mixture flowing into the pre-combustion chamber via a nozzle formed on an end portion of the pre-combustion chamber from a main combustion chamber may form a second swirl flow which swirls about and around the longitudinal axis of the pre-combustion chamber inside the pre-combustion chamber, the second swirl flow swirling in a direction opposite to a swirl direction of the first swirl flow.

Accordingly, the second swirl flow swirls in a direction opposite to the swirl direction of the first swirl flow formed by the ignition fuel gas, and thus the two swirl flows collide with each other in the pre-combustion chamber to promote mixing. Thus, uniform mixing of air-fuel mixture in the pre-combustion chamber is promoted, which makes it possible to improve thermal efficiency of the gas engine and to further improve the trap effect to trap the ignition fuel gas.

Advantageous Effects

According to at least one embodiment of the present invention, it is possible to extend the time the ignition fuel gas stays in the pre-combustion chamber by providing the opening of the gas supply channel for the pre-combustion chamber on the pre-combustion chamber so that the opening faces into a tangent direction of the inner peripheral surface of the pre-combustion chamber. As a result, it is possible to improve combustion efficiency and to reduce excessive supply of ignition fuel gas.

BRIEF DESCRIPTION OF DRAWINGS

FIG. 3A is a schematic front view of a pre-combustion chamber of the pre-combustion-chamber type gas engine, and FIG. 3B is a top view of the same.

FIG. 3B is a top view of the same.

FIG. 17A is a chart showing a supply pressure of ignition fuel gas and a cylinder pressure. FIG. 17B is a chart showing a lift amount of a check valve. FIG. 17C is a chart showing a flow rate of ignition fuel gas having flowed through the check valve.

DETAILED DESCRIPTION

Embodiments of the present invention will now be described in detail with reference to the accompanying drawings. It should be noted that, unless otherwise particularly specified, the sizes, materials, shapes, and relative arrangement or the like of constituent components described in these embodiments are not intended to limit the scope of this invention.

First Embodiment

Figure 1:
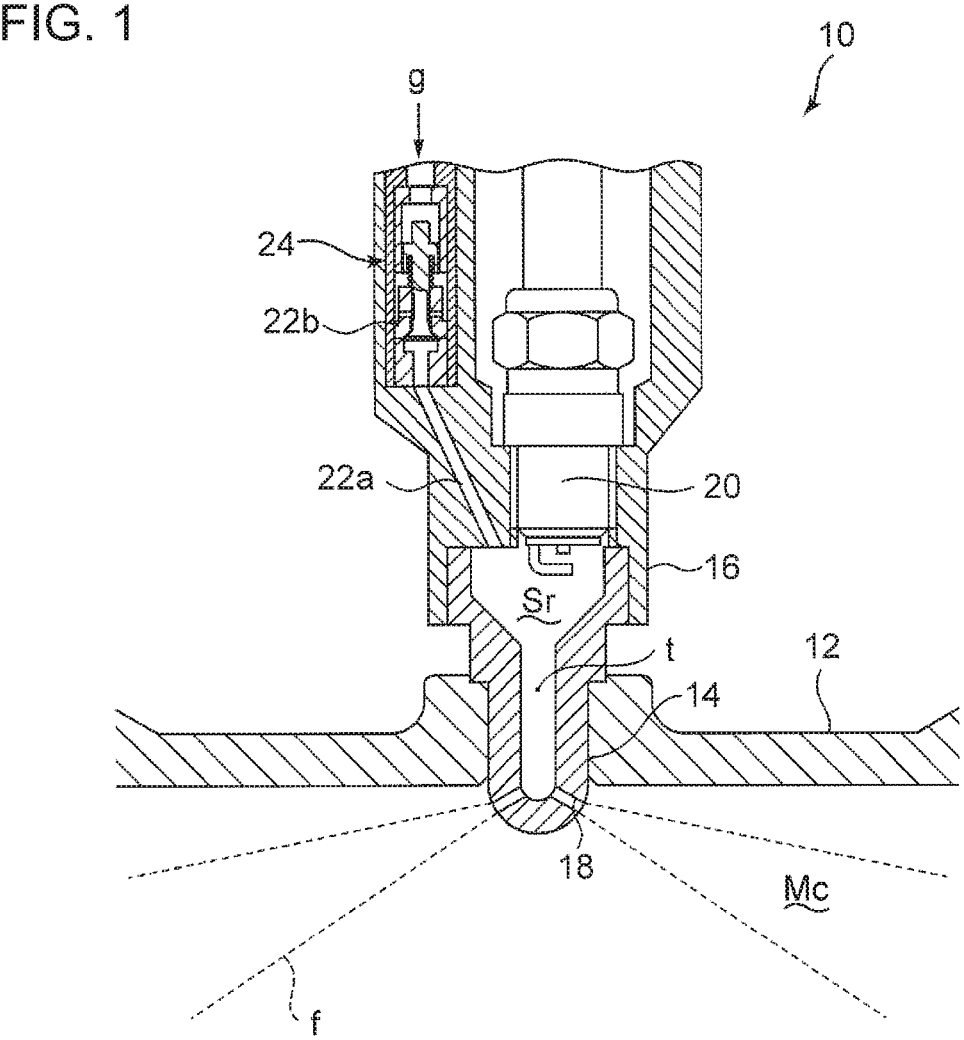
FIG. 1 is a front cross-sectional view of a cylinder head portion of a pre-combustion-chamber type gas engine according to the first embodiment of the present invention.

A pre-combustion-chamber type gas engine according to the first embodiment of the present invention will be described with reference to FIGS. 1 to 5. FIG. 1 is a diagram of a cylinder head portion 10 of a pre-combustion-chamber type gas engine according to the present embodiment. A main combustion chamber Mc is formed inside a cylinder 12. A pre-combustion chamber Sr is formed by a pre-combustion-chamber member 14 of a hollow cylindrical shape having an outer diameter varied in a longitudinal axial direction, and a cover member 16 disposed so as to cover an upper opening of the pre-combustion-chamber member 14. The pre-combustion-chamber member 14 is fixed by press fitting in a fitting hole formed in the middle of an upper part of the cylinder 12. A large-diameter section having a large inner diameter at an upper part is formed inside the pre-combustion-chamber member 14, and a throat section "t" of a cylindrical shape having an inner diameter smaller than that of the large-diameter section is formed below the large-diameter section. A transitional section with an inner diameter gradually decreasing from the large-diameter section toward the throat section "t" is formed between the large-diameter section and the throat section "t". A plurality of nozzles 18 is formed dispersedly in the circumferential direction on a lower end of the pre-combustion-chamber member 14, the nozzles 18 opening into the main combustion chamber Mc. The plurality of nozzles 18 communicates with the throat section "t".

An intake port (not illustrated) with an intake valve and an exhaust port (not illustrated) with an exhaust valve are disposed on either side of the pre-combustion chamber Sr of the cylinder head portion. The cover member 16 houses a spark plug 20, and a gas supply channel 22*a* for pre-combustion chamber for supplying fuel gas such as methane gas or ignition fuel gas such as rich air-fuel mixture to the pre-combustion chamber Sr is formed in the cover member 16. Specifically, in the present embodiment, the gas supply channel 22*a* for pre-combustion chamber has an opening on an upper wall of a partition wall forming the pre-combustion chamber Sr. Flame-propagating combustion occurs in the pre-combustion-chamber type gas engine, starting from ignition of ignition fuel gas by the spark plug 20. A flame formed in the pre-combustion chamber Sr is injected into the main combustion chamber Mc through the nozzles 18 in form of a torch f.

Figure 2:
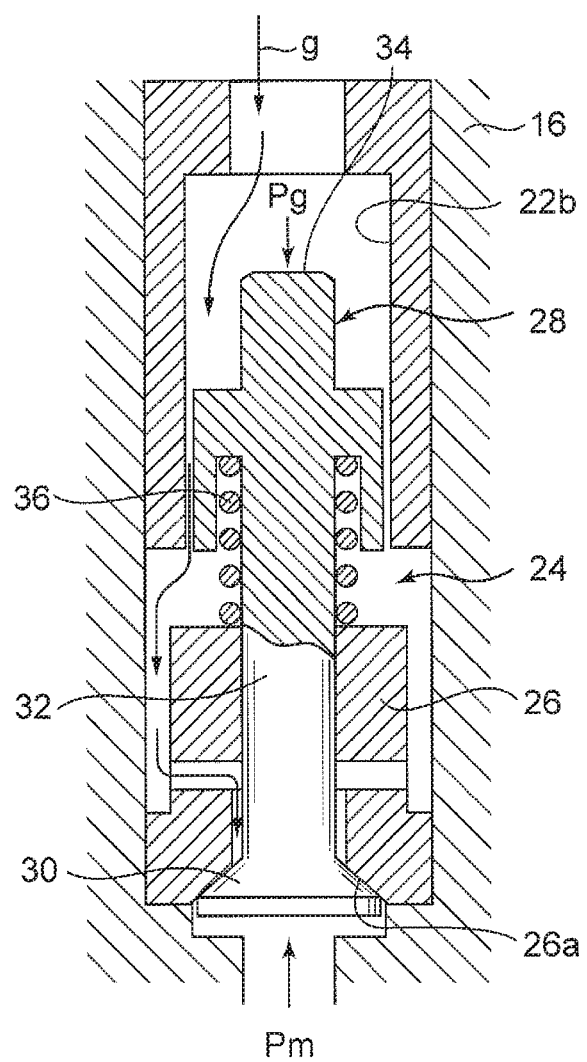
FIG. 2 is a front cross-sectional view of a check valve disposed on the cylinder head portion.
Figure 17A:
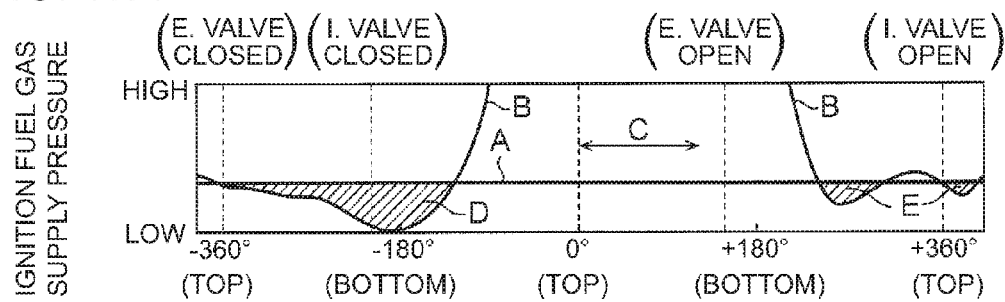
FIGS. 17A to 17C illustrate behaviors of a pre-combustion chamber of a conventional pre-combustion-chamber type gas engine.
Figure 17B:
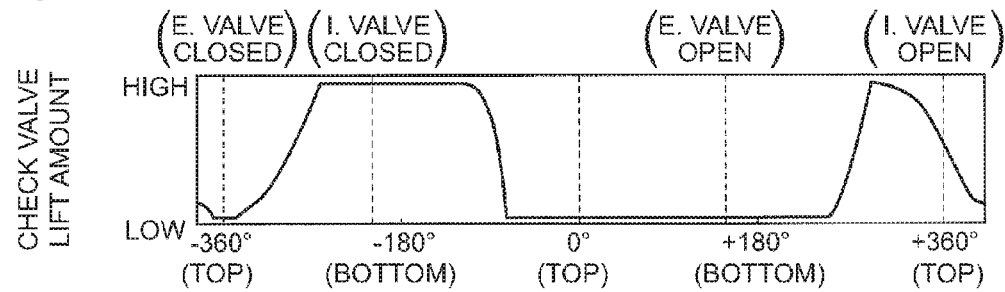
Figure 17C:
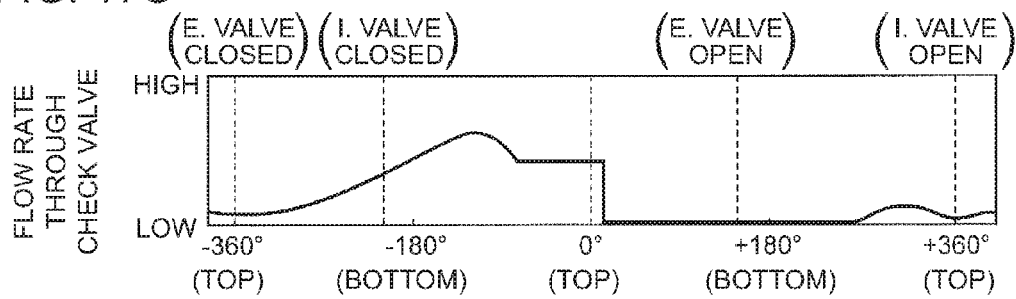

As illustrated in FIG. 2, a gas supply channel 22*b* for pre-combustion chamber having a larger diameter than the gas supply channel 22*a* for pre-combustion chamber is formed on the upstream side of the gas supply channel 22*a* for pre-combustion chamber, and a check valve 24 is disposed in the gas supply channel 22*b* for pre-combustion chamber. A compressor (not illustrated) for supplying ignition fuel gas "g" to the pre-combustion chamber Sr is disposed in the gas supply channel for pre-combustion chamber on the upstream side of the check valve 24. The compressor applies an ignition-fuel-gas supply pressure, which is a set pressure, to the check valve 24, as represented by line A in FIG. 17A. If a pressure inside a pre-combustion chamber (i.e., a cylinder pressure in the main combustion chamber Mc) becomes lower than the ignition-fuel-gas supply pressure applied to the check valve 24, the check valve 24 opens and the ignition fuel gas "g" is injected into the pre-combustion chamber Sr.

Next, the configuration of the check valve 24 will be described on the basis of FIG. 2. A hollow cylindrical body 26 forming a valve seat is fixed to an inner wall of the gas supply channel 22*b* for pre-combustion chamber. A movable member 28 is disposed inside the gas supply channel 22*b* for pre-combustion chamber, the movable member 28 including a valve body 30 of a conical shape, a valve stem 32, and a valve head 34 having a portion with a diameter larger than that of the valve stem 32. The valve body 30, the valve stem 32, and the valve head 34 are integrally formed into one piece. The valve body 30 is disposed on an end (downstream side) of the valve stem 32, and the valve head 34 is disposed on the other end (upstream side) of the valve stem 32. The movable member 28 is disposed inside the gas supply channel 22*b* for pre-combustion chamber with the valve stem 32 being inserted through a hollow section of the hollow cylindrical body 26. The valve body 30 has an outer diameter larger than an inner diameter of the hollow section of the hollow cylindrical body 26. A coil spring 36 is disposed between the hollow cylindrical body 26 and the valve head 34. In the illustrated embodiment, the coil spring 36 is disposed in a contracted state, and an elastic force of the coil spring 36 is biased in such a direction that the valve body 30 is pressed to contact a valve seat 26*a* having a conical surface formed on a lower end of the hollow cylindrical body 26.

A gas flow channel is formed between the inner wall of the gas supply channel 22*b* for pre-combustion chamber and the valve head 34 and the hollow cylindrical body 26, and between the valve stem 32 and the hollow cylindrical body 26. The compressor applies a preset ignition-fuel-gas supply pressure Pg to the valve head 34 of the check valve 24. When an expression of (Pg>cylindrical pressure Pm+elastic force of coil spring 36) is satisfied, the check valve 24 opens against the biasing force of the coil spring 36, and ignition fuel gas "g" is injected into the pre-combustion chamber Sr.

FIGS. 3 and 4 are diagrams schematically illustrating the pre-combustion-chamber member 14 forming the pre-combustion chamber Sr and the gas supply channels 22*a* and 22*b* for pre-combustion chamber. FIG. 3 corresponds to the present embodiment, and FIG. 4 to a comparative example. In FIGS. 3 and 4, the cover member 16 covering an upper opening of the pre-combustion-chamber member 14 is not illustrated. In FIG. 3A (front view), the gas supply channel 22*a* for pre-combustion chamber of the present embodiment is formed on the cover member 18 so as to be slightly oblique with respect to the vertical direction and to have an opening on an upper surface of the pre-combustion chamber Sr. Further, as illustrated in FIG. 3B (top view), the gas supply channel 22*a* for pre-combustion chamber has an opening facing in a tangent direction of a side-wall inner peripheral surface 14*a* of the pre-combustion-chamber member 14 forming the pre-combustion chamber Sr. Thus, the ignition fuel gas "g" injected into the pre-combustion chamber Sr forms a swirl flow s1 which is centered at the longitudinal axis "x" of the pre-combustion chamber Sr and which swirls around the longitudinal axis "x".

Figure 4A:
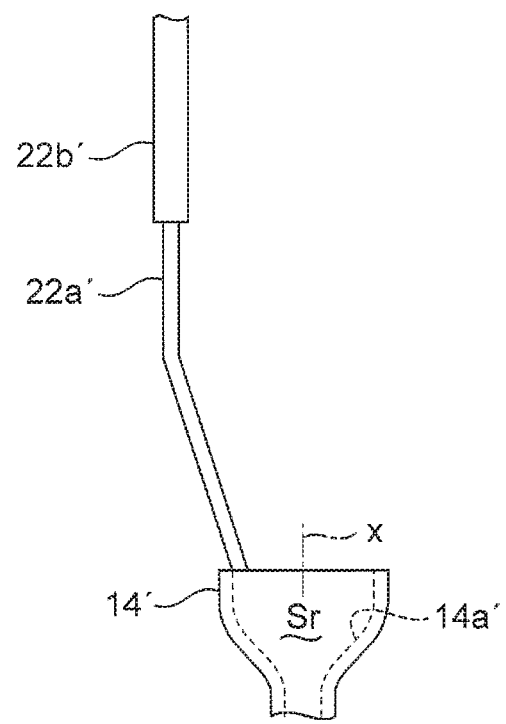
FIG. 4A is a schematic front view of a pre-combustion chamber illustrated as a comparative example.
Figure 4B:
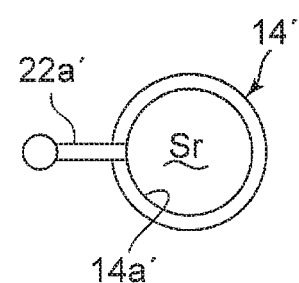

In contrast, in FIG. 4A (front view), the gas supply channel 22*a*' for pre-combustion chamber of the comparative example has an opening at a position in contact with a side wall of an upper opening of the pre-combustion chamber Sr. Further, as illustrated in FIG. 4B, the gas supply channel 22*a*' for pre-combustion chamber has an opening facing in a direction substantially orthogonal to a tangent direction of a side-wall inner peripheral surface 14*a*' of the pre-combustion-chamber member 14'.

Figure 5A:
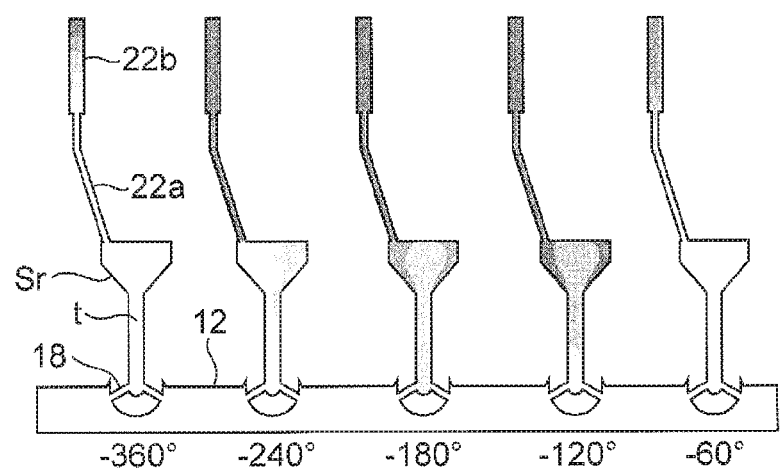
FIG. 5A is an explanatory diagram showing a trap effect of the pre-combustion chamber according to the first embodiment illustrated in FIGS. 3A and 3B.
Figure 5B:
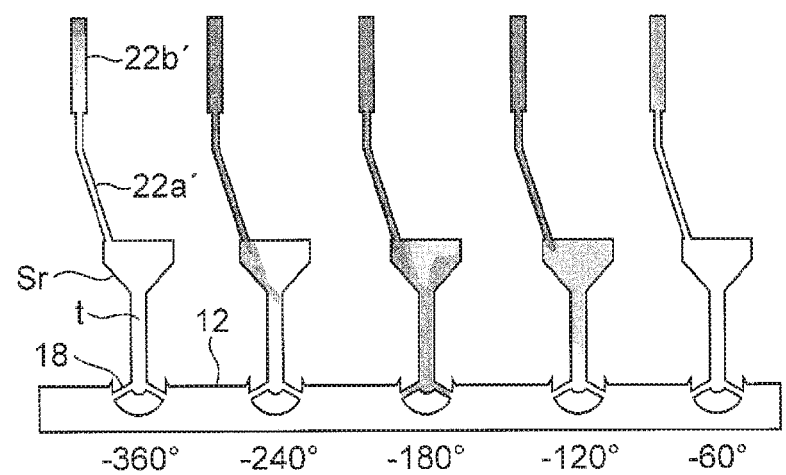
FIG. 5B is an explanatory diagram showing a trap effect of the pre-combustion chamber according to the comparative example illustrated in FIGS. 4A and 4B.

FIGS. 5A to 6B show results of tests of supplying methane gas to the pre-combustion chamber Sr as ignition fuel gas "g" in the above configurations. In FIGS. 5A and 5B, methane gas with a higher concentration is illustrated in darker shading. FIG. 5A illustrates test results of the present embodiment, and FIG. 5B illustrates test results of the comparative example. From the drawings, it can be seen that the ignition fuel gas "g" is injected into the pre-combustion chamber Sr when the crank angle is from (−240°) to (−120°). In the present embodiment, when the crank angle is from (−240°) to (−180°), the ignition fuel gas "g" leaks little from the pre-combustion chamber Sr to the main combustion chamber Mc, and when the crank angle is (−120°), the ignition fuel gas "g" accumulated in the pre-combustion chamber Sr has a high concentration.

In contrast, in the comparative example, when the crank angle is (−180°), the ignition fuel gas "g" leaks greatly from the pre-combustion chamber Sr to the main combustion chamber Mc, and when the crank angle is (−120°), the ignition fuel gas "g" accumulated in the pre-combustion chamber Sr has a lower concentration than the present embodiment.

Accordingly, it can be seen that the present embodiment has a higher trap effect to trap the ignition fuel gas "g" supplied to the pre-combustion chamber Sr than the comparative example.

Figure 6A:
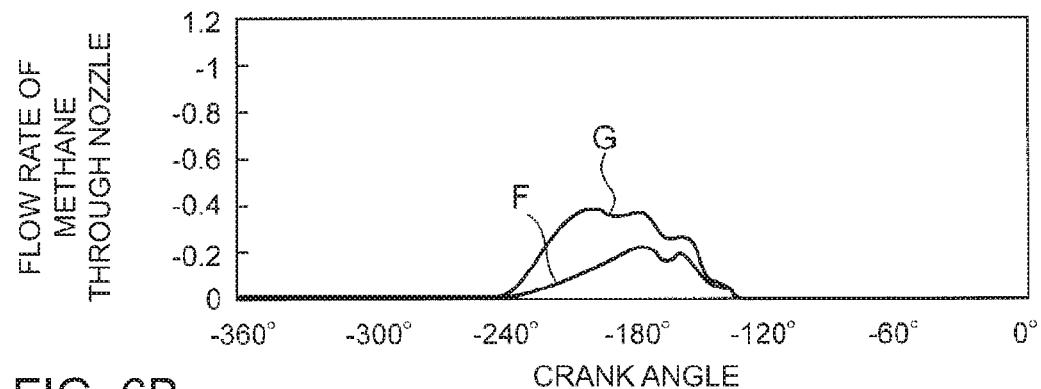
FIGS. 6A and 6B are charts showing a trap effect of the pre-combustion chamber of the first embodiment and the comparative example.
Figure 6B:
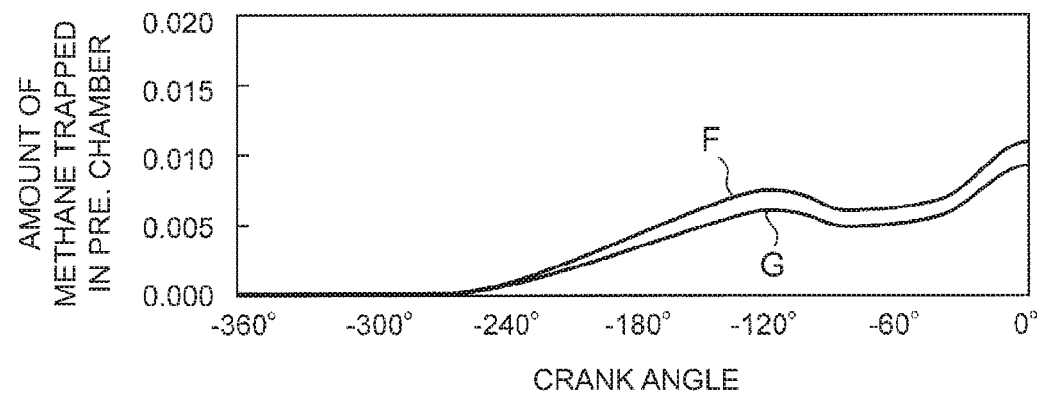

FIG. 6A shows a flow rate of methane gas having flowed through the nozzles 18 into the main combustion chamber Mc in an intake-compression stroke corresponding to the crank angle of from (−360°) to (0°), and FIG. 6B shows a flow rate of pre-combustion-chamber gas trapped in the pre-combustion chamber Sr in the same intake-compression stroke. In the drawings, line F represents test results of the present embodiment, and line G represents test results of the comparative example. From the drawings, it can be seen that the present embodiment has a higher trap effect to trap the ignition fuel gas "g" in the pre-combustion chamber Sr.

According to the present embodiment, the ignition fuel gas "g" supplied to the pre-combustion chamber Sr forms the swirl flow s1 swirling about the longitudinal axis "x" of the pre-combustion chamber Sr in the pre-combustion chamber Sr, which makes it possible to extend the time the ignition fuel gas "g" stays in the pre-combustion chamber Sr. Thus, it is possible to reduce outflow of the ignition fuel gas "g" in a non-combusted state from the nozzles 18 to the main combustion chamber Mc. As a result, it is possible to improve combustion efficiency and to reduce excessive supply of the ignition fuel gas "g".

Moreover, since it is possible to reduce supply of the ignition fuel gas "g", it is possible to reduce the capacity of a compressor for supplying the ignition fuel gas "g" to the pre-combustion chamber Sr, and to reduce the cost.

Further, the check valve 24 may be substituted by a solenoid valve controlled to open and close in accordance with a detection value of a sensor provided to detect a pressure inside the pre-combustion chamber, or an opening-closing valve which opens and closes in accordance with a crank angle of a piston.

Second Embodiment

Figure 7:
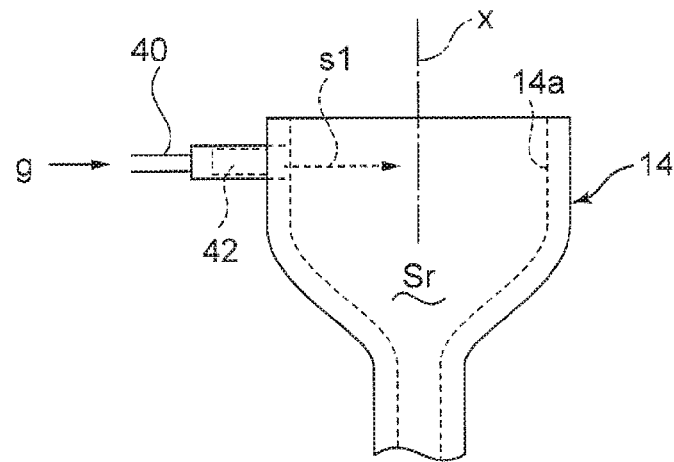
FIG. 7 is a front view of a pre-combustion chamber of a pre-combustion-chamber type gas engine according to the second embodiment of the present invention.

Next, the second embodiment of the present invention will be described with reference to FIGS. 7 and 8. The present embodiment is an example in which a space for forming a gas supply channel for pre-combustion chamber can be secured at the side of the pre-combustion chamber Sr. In the present embodiment, a gas supply channel 40 for pre-combustion chamber (gas supply tube for pre-combustion chamber) for supplying the ignition fuel gas "g" to the pre-combustion chamber Sr is disposed on the side of the pre-combustion-chamber member 14. The gas supply channel 40 for pre-combustion chamber is attached substantially in the horizontal direction to an upper end section of the pre-combustion chamber Sr, which is an upper end section of the large diameter section of the pre-combustion chamber Sr. Specifically, in the present embodiment, the gas supply channel for pre-combustion chamber has an opening on an upper part of a side wall of a partition wall forming the pre-combustion chamber Sr. Inside the gas supply channel 40 for pre-combustion chamber, a check valve 42 having the same configuration as the check valve 24 in the first embodiment is provided. The cover member 16 covering an upper opening of the pre-combustion-chamber member 14 is not illustrated.

In other words, the operation of the check valve 42 is similar to that of the check valve 24 in the first embodiment. Specifically, the check valve 42 closes if an expression of (ignition-fuel-gas supply pressure Pg+elastic force of coil spring 36≤cylinder pressure Pm) is satisfied, and opens if an expression of (ignition-fuel-gas supply pressure Pg>elastic force of coil spring 36+cylinder pressure Pm) is satisfied.

Figure 8:
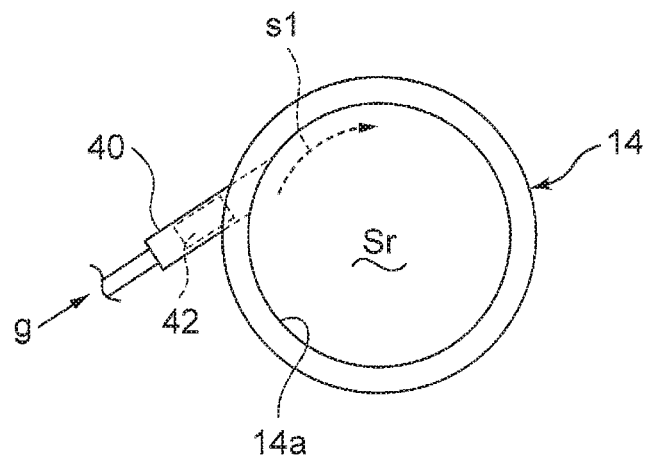
FIG. 8 is a planar view of the pre-combustion chamber illustrated in FIG. 8.

As illustrated in FIG. 8, the gas supply channel 40 for pre-combustion chamber has an opening facing in a tangent direction of the side-wall inner peripheral surface 14a of the pre-combustion-chamber member 14. Thus, the ignition fuel gas "g" injected into the pre-combustion chamber Sr from the gas supply channel 40 for pre-combustion chamber forms the swirl flow s1 which swirls about the longitudinal axis "x" of the pre-combustion chamber Sr.

According to the present embodiment, the ignition fuel gas "g" forms the swirl flow s1 centered at the longitudinal axis "x" of the pre-combustion chamber Sr and swirling around the longitudinal axis "x" of the pre-combustion chamber Sr inside the pre-combustion chamber Sr, which makes it possible to improve the trap effect to trap the ignition fuel gas "g" in the pre-combustion chamber Sr. Further, the ignition fuel gas "g" is injected substantially in the horizontal direction from the gas supply channel 40 for pre-combustion chamber to the pre-combustion chamber Sr, which makes it possible to further improve the trap effect. Moreover, the gas supply channel 40 for pre-comubstion chamber can be disposed on the side of the pre-combustion-chamber member 14 forming the pre-combustion chamber Sr, which makes it possible to simplify the configuration of the gas supply channel 40 for pre-comubstion chamber and to reduce the cost.

Third Embodiment

Next, the third embodiment of the present invention will be described with reference to FIGS. 9 and 11. In the present embodiment, similarly to the first embodiment, the gas supply channels 22a and 22b for pre-combustion chamber are disposed inside the cover member 16 disposed on an upper part of the pre-combustion-chamber member 14 so as to extend to an upper end of the pre-combustion-chamber member 14.

Figure 9:
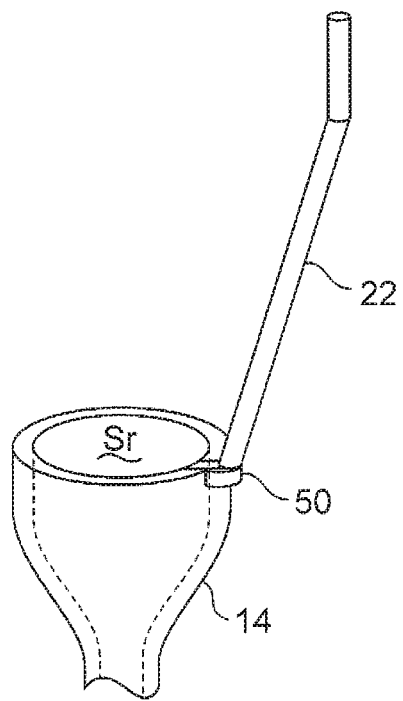
FIG. 9 is a perspective view of a pre-combustion chamber of a pre-combustion-chamber type gas engine according to the third embodiment of the present invention.

As illustrated in FIG. 9, the cover member 16 connects to a pocket portion 50 formed on the upper end of the pre-combustion-chamber member 14.

Figure 10:
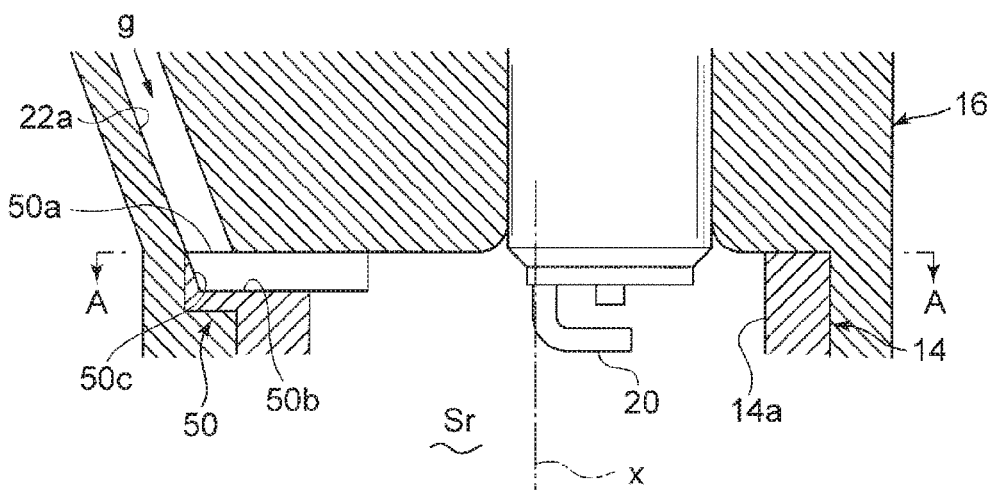
FIG. 10 is a front cross-sectional view of the pre-combustion chamber illustrated in FIG. 9.
Figure 11:
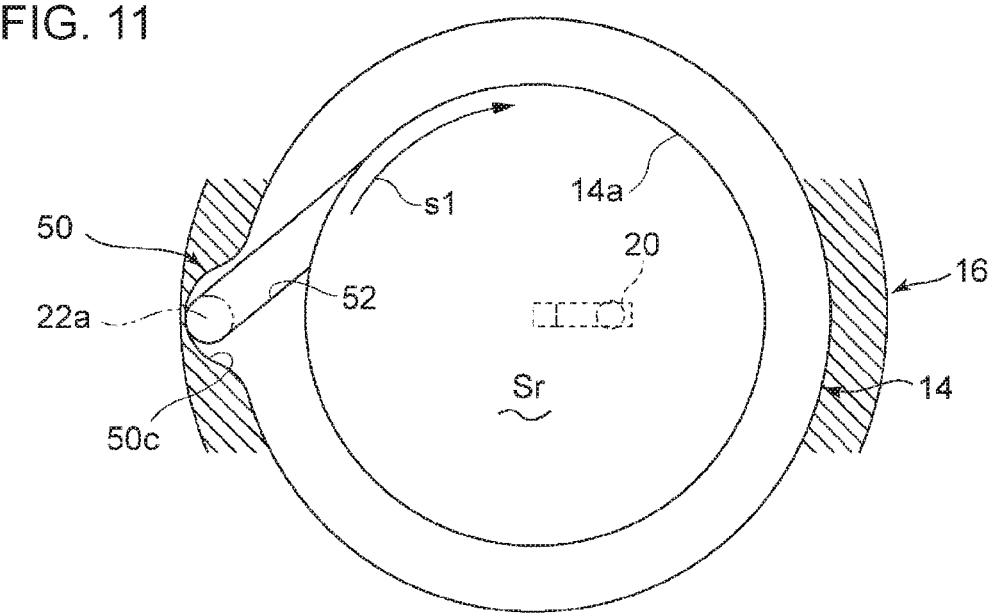
FIG. 11 is a cross-sectional view taken along line A-A in FIG. 10.

As illustrated in FIGS. 10 and 11, the pocket portion 50 includes an upper surface 50a and a bottom surface 50b, which are substantially horizontal, and a side surface 50c of a semi-cylindrical shape. The upper surface 50a is formed by a lower surface of the cover member 16. The gas supply channel 22a for pre-combustion chamber has an opening on an outer end section of the upper surface 50a. A hole 52 with a linear axis is formed on an upper end surface of the partition wall of the pre-combustion-chamber member 14 so as to have a bottom surface continuously extending from the bottom surface 50b without a step, the hole 52 having an opening which opens into the pre-combustion chamber Sr and faces in a tangent direction of the side-wall inner peripheral surface 14a of the pre-combustion-chamber member 14. In the illustrated embodiment, the outer (longer) wall surface of the hole 52 extends along the tangent direction of the side-wall inner peripheral surface 14a of the pre-combustion-chamber member 14.

With the above configuration, pre-combustion-chamber gas "g" having flowed into the pocket portion 50 from the gas supply channel 22a for pre-combustion chamber hits the bottom surface 50b and changes its direction to the horizontal direction to flow through the hole 52, thereby being injected into the pre-combustion chamber Sr. The pre-combustion chamber gas "g" is injected in the tangent direction of the side-wall inner peripheral surface 14a, thereby forming the swirl flow s1 centered at the longitudinal axis "x" of the pre-combustion-chamber member 14.

As described above, the ignition fuel gas "g" forms the swirl flow s1 while being injected into the pre-combustion chamber Sr in the horizontal direction, which makes it possible to improve the trap effect to trap the ignition fuel gas "g" in the pre-combustion chamber Sr considerably. From test results, it was found that the trap effect to trap the ignition fuel gas "g" according to the present embodiment is higher than that in the first embodiment illustrated in FIG. 5A.

Fourth Embodiment

Figure 12:
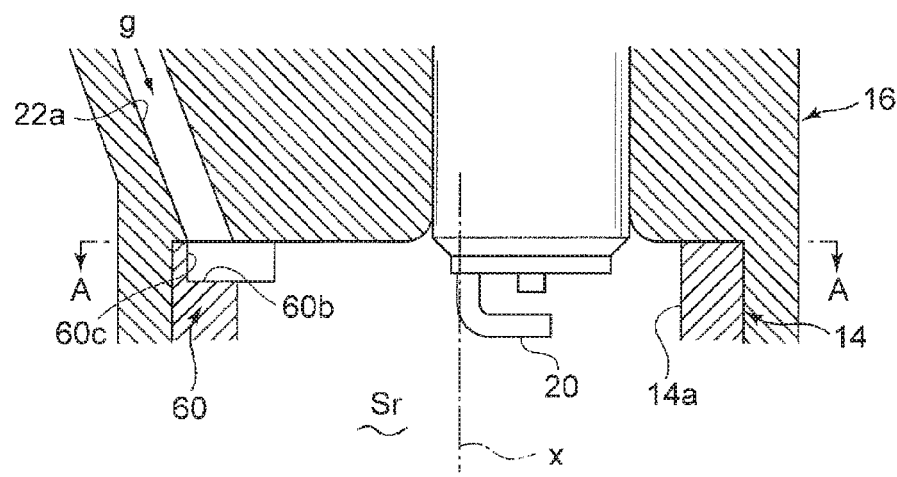
FIG. 12 is a front cross-sectional view of a pre-combustion chamber of a pre-combustion-chamber type gas engine according to the fourth embodiment of the present invention.
Figure 13:
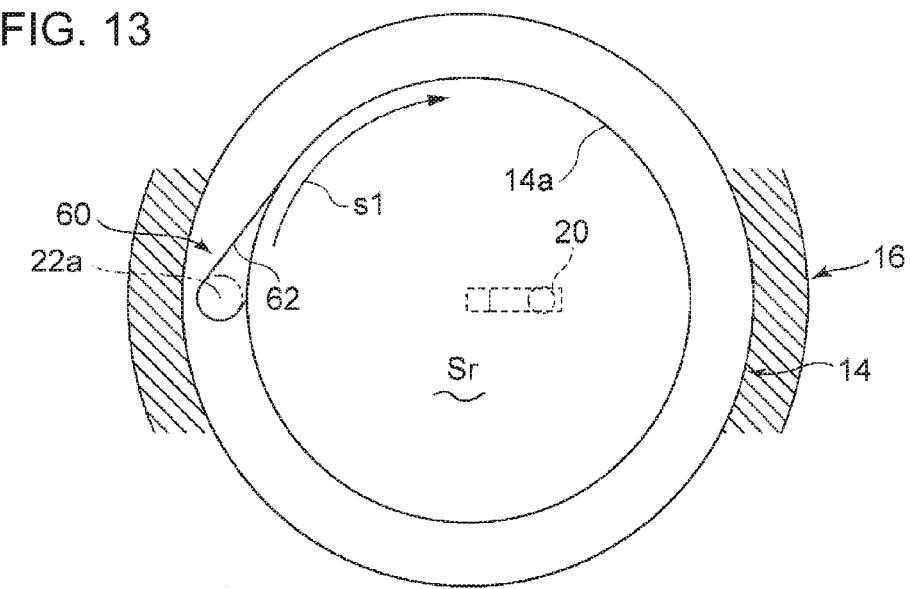
FIG. 13 is a cross-sectional view taken along line B-B of the pre-combustion chamber in FIG. 12.

Next, the fourth embodiment of the present invention will be described with reference to FIGS. 12 and 13. The present embodiment is similar to the first embodiment and the third embodiment in that the gas supply channel 22a for pre-combustion chamber is formed inside the cover member 16 slightly oblique and downward. Further, a pocket portion 60 is provided, which is similar to the third embodiment.

However, the present embodiment is different from the third embodiment in that the pocket portion 60 is formed inside the partition wall of the pre-combustion-chamber member 14. That is, whereas the pocket portion 50 of the third embodiment is disposed outside the outer peripheral surface of the partition wall of the pre-combustion-chamber member 14, the pocket portion 60 of the present embodiment is disposed inside the outer peripheral surface of the partition wall of the pre-combustion-chamber member 14.

In the present embodiment, the pocket portion 60 is formed by cutting an inner peripheral side of an upper end surface of a part of the partition wall of the pre-combustion-chamber member 14. The pocket portion 60 has a bottom surface 60b forming a substantially-horizontal flat surface, and a side surface 60c forming a semi-arc surface extending continuously from the gas supply channel 22a for pre-combustion chamber without a step. Further, a hole 62 communicating with the pocket portion 60 is disposed so as to have a bottom surface extending continuously from the bottom surface 60b and an opening into the pre-combustion chamber Sr. The hole 62 is facing substantially in the horizontal direction, and in a tangent direction of the side-wall inner peripheral surface 14a of the pre-combustion-chamber member 14. In the illustrated embodiment, the outer (longer) wall surface of the hole 62 extends along the tangent direction of the side-wall inner peripheral surface 14a of the pre-combustion-chamber member 14.

In the present embodiment, the pre-combustion chamber gas "g" having flowed into the pocket portion 60 from the gas supply channel 22 for pre-combustion chamber is injected into the pre-combustion chamber Sr while changing its direction to the horizontal direction at the pocket portion 60, and forms the swirl flow s1 centered at the longitudinal axis "x" and swirling about the longitudinal axis "x", which makes it possible to further improve the trap effect to trap the pre-combustion chamber gas "g" in the pre-combustion chamber Sr.

Further, since the pocket portion 60 is formed on the partition wall of the pre-combustion-chamber member 14, formation of a pocket portion is facilitated as compared to the third embodiment, which is advantageous in that a special space is not required to form a pocket portion.

Fifth Embodiment

Figure 14:
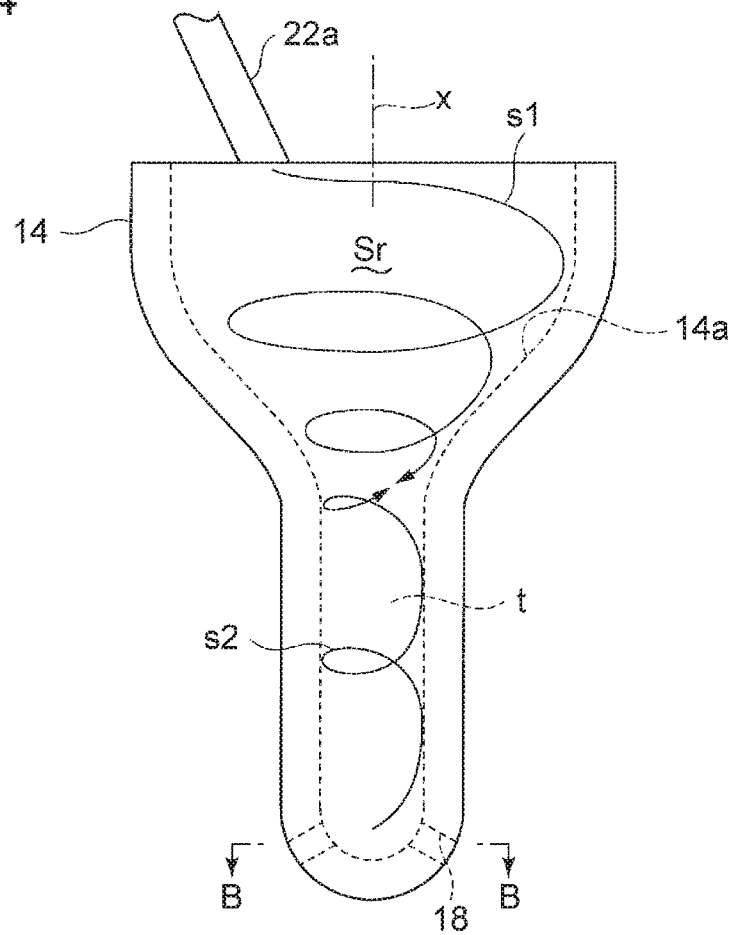
FIG. 14 is a schematic front view of a pre-combustion chamber of a pre-combustion-chamber type gas engine according to the fifth embodiment of the present invention.
Figure 15:
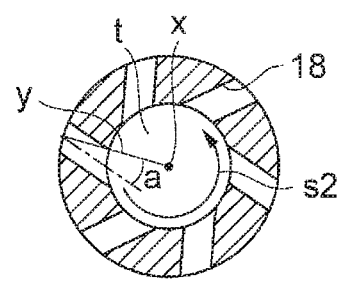
FIG. 15 is a cross-sectional view taken along line B-B in FIG. 14.

Next, the fifth embodiment of the present invention will be described with reference to FIGS. 14 and 15. In the present embodiment, the plurality (six in FIG. 15) of nozzles 18 formed on the lower end of the pre-combustion-chamber member 14 are oblique by a set angle "a" with respect to a transverse line (straight horizontal line) "y" in a transverse plane orthogonal to the longitudinal axis "x". Further, the nozzles 18 are oblique in a direction opposite from an obliquity direction of the gas supply channel 22a for pre-combustion chamber with respect to the side-wall inner peripheral surface 14a of the pre-combustion-chamber member 14. Further, the set angle "a" is selected from among obliquity angles not greater than the angle at which the nozzles 18 face in the tangent direction of the inner peripheral surface of the throat section "t". With a greater set angle "a", it is possible to from a swirl flow having a stronger centrifugal force.

The configuration is otherwise the same as that of the first embodiment, including for instance, the configuration of the pre-combustion chamber Sr, the gas supply channel 22a for pre-combustion chamber, and the check valve 24.

According to the present embodiment, lean premixed gas flowing into the pre-combustion chamber Sr from the main combustion chamber Mc ascends while forming a swirl flow s2 which is centered at the longitudinal axis "x" and which swirls around the longitudinal axis "x" inside the throat section "t". The swirl flow s2 swirls in a direction opposite to the swirl direction of the swirl flow s1 of the ignition fuel gas "g", and thus the two swirl flows collide with each other in the pre-combustion chamber Sr to promote mixing. Thus, lean premixed gas and the ignition fuel gas "g" are mixed uniformly in the pre-combustion chamber Sr, which makes it possible to improve thermal efficiency of the pre-combustion-chamber type gas engine and to further improve the trap effect to trap the ignition fuel gas.

The configuration of the nozzles 18 according to the present embodiment may be employed in the second to fourth embodiments.

Further, as a configuration of the nozzles 18 of the present embodiment, the nozzles 18 may have a center line parallel to the transverse line "y", and the center line may be shifted parallel from the center of the throat section "t" in the circumferential direction of the throat section "t", so that the nozzles 18 are oblique in a direction opposite to the oblique direction of the gas supply channel 22a for pre-combustion chamber.

Sixth Embodiment

Figure 16A:
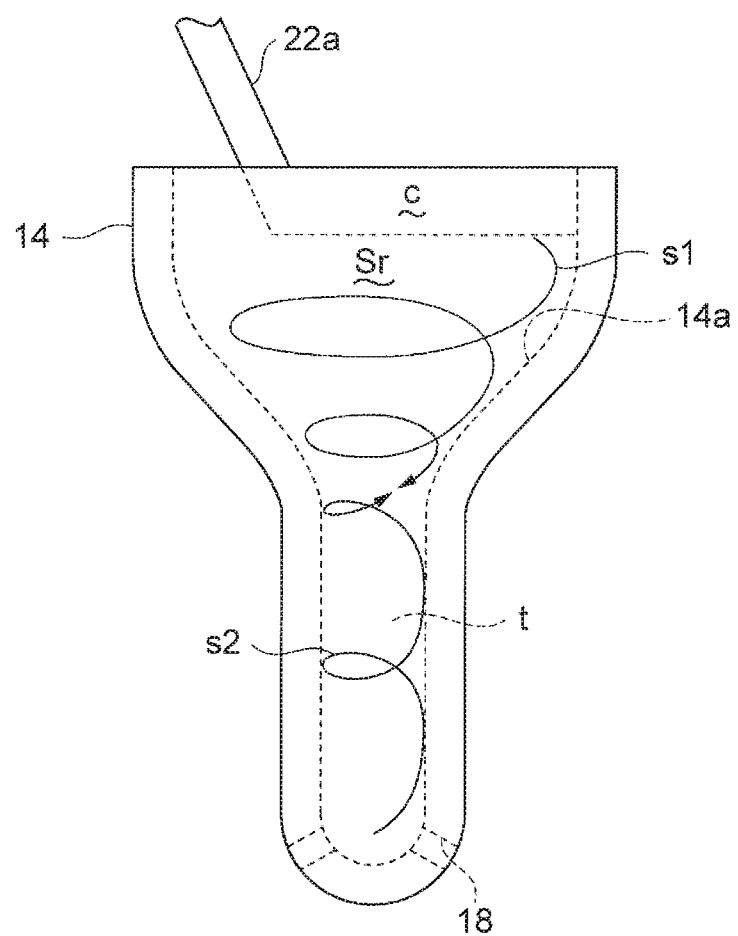
FIG. 16A is a schematic front view of a pre-combustion chamber of a pre-combustion-chamber type gas engine according to the sixth embodiment of the present invention.
Figure 16B:
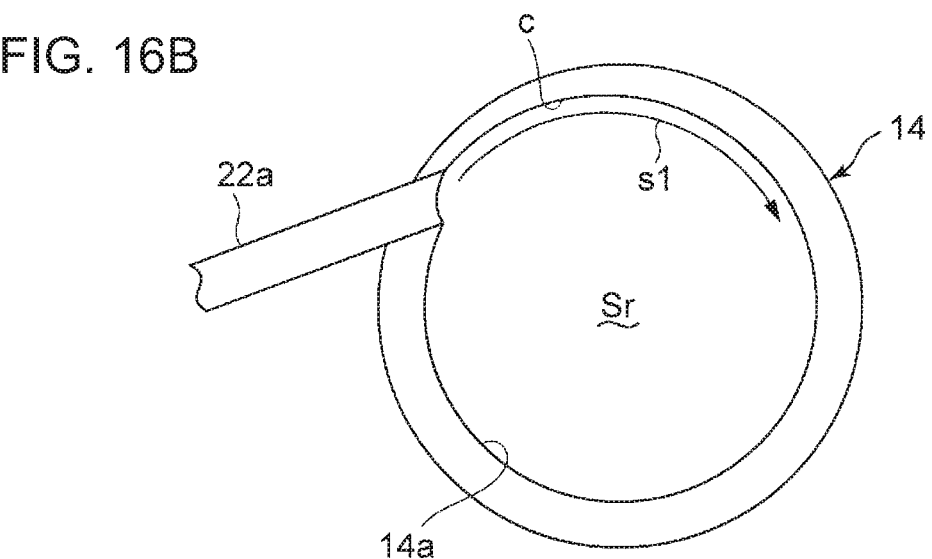
FIG. 16B is a top view of the same.

Next, the sixth embodiment of the present invention will be described with reference to FIG. 16. In the present embodiment, a region of the side-wall inner peripheral surface 14a of the pre-combustion chamber Sr including the opening of the gas supply channel 22a for pre-combustion chamber is cut out in an arc shape to form a cutout surface "c" of an arc shape, the region being at a side toward which the ignition fuel gas "g" flows from the opening of the gas supply channel 22a for pre-combustion chamber. As illustrated in FIG. 16A, the cutout surface "c" of an arc shape is formed in a band-shaped region extending in the horizontal direction at the same height as the opening of the gas supply channel 22a for pre-combustion chamber. Further, as illustrated in FIG. 16B, the side of the opening of the gas supply channel 22a for pre-combustion chamber is cut out to the greatest depth, and the cutout depth decreases toward the downstream side of the swirl flow s1. The configuration is otherwise the same as that of the fifth embodiment.

In this way, the swirl flow s1 formed by the ignition fuel gas "g" becomes a swirl flow with an even stronger centrifugal force, thereby being further mixed with the swirl flow s2 formed by lean premixed gas. Thus, it is possible to further improve the trap effect to trap the ignition fuel gas "g" inside the pre-combustion chamber Sr.

The cutout surface "c" of an arc shape may be formed on the side-wall inner peripheral surface 14a of the pre-combustion-chamber member 14 including the pocket portion 50 or the pocket portion 60 like the above described third and fourth embodiments.

INDUSTRIAL APPLICABILITY

According to at least one embodiment of the present invention, it is possible to provide a pre-combustion-chamber type gas engine with an improved trap effect to trap ignition fuel gas supplied to a pre-combustion chamber, thereby reducing an amount of ignition fuel gas flowing out of the pre-combustion chamber and suppressing a decrease in combustion efficiency.

DESCRIPTION OF REFERENCE NUMERALS

10 Cylinder head portion
12 Cylinder
14, 14' Pre-combustion-chamber member
14a, 14a' Side-wall inner peripheral surface
16 Cover member
18 Nozzle
20 Spark plug
22a, 22b, 22a', 22b' Gas supply channel for pre-combustion chamber
24, 42 Check valve (opening-closing valve)
26 Hollow cylindrical body
26a Valve seat
28 Movable member
30 Valve body
32 Valve stem
34 Valve head
36 Coil spring
40 Gas supply channel for pre-comubstion chamber
50, 60 Pocket portion
50a Upper surface
50b, 60b Bottom surface
50c, 60c Side surface
52, 62 Hole
Mc Main combustion chamber
Pg Ignition fuel gas supply pressure
Pm Cylinder pressure
Sr Pre-combustion chamber
a Set angle
c Arc-shaped cutout surface
f Torch
g Ignition fuel gas
s1 Swirl flow (first swirl flow)
s2 Swirl flow (second swirl flow)
t Throat portion
x Longitudinal axis
y Transverse line

The invention claimed is:

1. A pre-combustion-chamber type gas engine, comprising:
a pre-combustion chamber disposed on a cylinder head portion;
a spark plug disposed on an upper part of the pre-combustion chamber;
a pre-combustion-chamber gas supply mechanism configured to supply ignition fuel gas to the pre-combustion chamber via a gas supply channel for the pre-combustion chamber, the gas supply channel having an opening on an upper part of the pre-combustion chamber; and
an opening-closing valve configured to open and close the gas supply channel for the pre-combustion chamber,
wherein the opening of the gas supply channel for the pre-combustion chamber is disposed on an upper wall of a partition wall forming the pre-combustion chamber or on an upper section of a side wall of the partition wall, the opening facing in a tangent direction of a side-wall inner peripheral surface forming the pre-combustion chamber,
wherein the ignition fuel gas supplied to the pre-combustion chamber forms a first swirl flow which swirls about a longitudinal axis of the pre-combustion chamber inside the pre-combustion chamber,
wherein the gas supply channel for the pre-combustion chamber is disposed outside the partition wall forming the pre-combustion chamber, and is connected to the upper section of the side wall at least partially forming the pre-combustion chamber,
wherein the gas supply channel for the pre-combustion chamber extends downward toward the pre-combustion chamber from above the pre-combustion chamber,
wherein a pocket portion is disposed on an upper end of the side wall at least partially forming the pre-combustion chamber, the pocket portion including
an interior space into which the ignition fuel gas flows from the gas supply channel for the pre-combustion chamber,
a communication hole through which the interior space and the pre-combustion chamber communicate with each other, the communication hole having an opening facing in a tangent direction of the side-wall inner peripheral surface of the pre-combustion chamber,
and
wherein the gas supply channel for the pre-combustion chamber is connected to the pocket portion.

2. The pre-combustion-chamber type gas engine according to claim 1,
wherein the pocket portion is formed inside the partition wall forming the pre-combustion chamber.

3. The pre-combustion-chamber type gas engine according to claim 1,
wherein the side-wall inner peripheral surface of the pre-combustion chamber including the opening of the gas supply channel for the pre-combustion chamber has a region cut out to have a cutout surface formed into an arc shape, the region being on a side toward which the ignition fuel gas flows from the opening of the gas supply channel for the pre-combustion chamber.

4. The pre-combustion-chamber type gas engine according to claim 1,
wherein air-fuel mixture flowing into the pre-combustion chamber via a nozzle formed on an end portion of the pre-combustion chamber from a main combustion chamber forms a second swirl flow which swirls about the longitudinal axis of the pre-combustion chamber inside the pre-combustion chamber, the second swirl flow swirling in a direction opposite to a swirl direction the first swirl flow.

5. A pre-combustion-chamber type gas engine, comprising:
a pre-combustion chamber disposed on a cylinder head portion;
a spark plug disposed on an upper part of the pre-combustion chamber;
a pre-combustion-chamber gas supply mechanism configured to supply ignition fuel gas to the pre-combustion chamber via a gas supply channel for the pre-combustion chamber, the gas supply channel having an opening on an upper part of the pre-combustion chamber; and
an opening-closing valve configured to open and close the gas supply channel for the pre-combustion chamber,
wherein the opening of the gas supply channel for the pre-combustion chamber is disposed on an upper wall of a partition wall forming the pre-combustion chamber or on an upper section of a side wall of the partition wall, the opening facing in a tangent direction of a side-wall inner peripheral surface forming the pre-combustion chamber, wherein the ignition fuel gas supplied to the pre-combustion chamber forms a first swirl flow which swirls about a longitudinal axis of the pre-combustion chamber inside the pre-combustion chamber, wherein the gas supply channel for the pre-combustion chamber is disposed outside the partition wall forming the pre-combustion chamber, and is connected to the upper section of the side wall at least partially forming the pre-combustion chamber, wherein the gas supply channel for the pre-combustion chamber extends downward toward the pre-combustion chamber from above the pre-combustion chamber, wherein a pocket portion is disposed on a joint between the gas supply channel for the pre-combustion chamber and the partition wall forming the pre-combustion chamber, the pocket portion including an interior space into which the ignition fuel gas flows from the gas supply channel for the pre-combustion chamber, and a communication hole through which the interior space and the pre-combustion chamber communicate with each other, the communication hole having an opening facing in a tangent direction of the side-wall inner peripheral surface of the pre-combustion chamber, and wherein the side-wall inner peripheral surface of the pre-combustion chamber including the opening of the gas supply channel for the pre-combustion chamber has a region cut out to have a cutout surface formed into an arc shape, the region being on a side toward which the ignition fuel gas flows from the opening of the gas supply channel for the pre-combustion chamber.

6. A pre-combustion-chamber type gas engine, comprising:

a pre-combustion chamber disposed on a cylinder head portion;

a spark plug disposed on an upper part of the pre-combustion chamber;

a pre-combustion-chamber gas supply mechanism configured to supply ignition fuel gas to the pre-combustion chamber via a gas supply channel for the pre-combustion chamber, the gas supply channel having an opening on an upper part of the pre-combustion chamber; and an opening-closing valve configured to open and close the gas supply channel for the pre-combustion chamber, wherein the opening of the gas supply channel for the pre-combustion chamber is disposed on an upper wall of a partition wall forming the pre-combustion chamber or on an upper section of a side wall of the partition wall, the opening facing in a tangent direction of a side-wall inner peripheral surface forming the pre-combustion chamber, wherein the ignition fuel gas supplied to the pre-combustion chamber forms a first swirl flow which swirls about a longitudinal axis of the pre-combustion chamber inside the pre-combustion chamber, wherein the gas supply channel for the pre-combustion chamber is disposed outside the partition wall forming the pre-combustion chamber, and is connected to the upper section of the side wall at least partially forming the pre-combustion chamber, wherein the gas supply channel for the pre-combustion chamber extends downward toward the pre-combustion chamber from above the pre-combustion chamber, wherein a pocket portion is disposed on a joint between the gas supply channel for the pre-combustion chamber and the partition wall forming the pre-combustion chamber, the pocket portion including an interior space into which the ignition fuel gas flows from the gas supply channel for the pre-combustion chamber, and a communication hole through which the interior space and the pre-combustion chamber communicate with each other, the communication hole having an opening facing in a tangent direction of the side-wall inner peripheral surface of the pre-combustion chamber, and wherein air-fuel mixture flowing into the pre-combustion chamber via a nozzle formed on an end portion of the pre-combustion chamber from a main combustion chamber forms a second swirl flow which swirls about the longitudinal axis of the pre-combustion chamber inside the pre-combustion chamber, the second swirl flow swirling in a direction opposite to a swirl direction the first swirl flow.

* * * * *